Jan. 8, 1957 D. GIACOSA 2,776,721
VEHICLE BODY WITH DETACHABLE ENGINE SUPPORTING FRONT FRAME
Filed March 3, 1954 3 Sheets-Sheet 1

United States Patent Office 2,776,721
Patented Jan. 8, 1957

2,776,721
VEHICLE BODY WITH DETACHABLE ENGINE SUPPORTING FRONT FRAME

Dante Giacosa, Turin, Italy, assignor to Fiat Societa per Azioni, Turin, Italy

Application March 3, 1954, Serial No. 413,867

Claims priority, application Italy March 4, 1953

1 Claim. (Cl. 180—12)

This invention relates to chassisless motor vehicles in which the engine, fore wheels and associated suspension members are supported by a frame detachably secured to suitable members of the body.

The object of this invention is to considerably simplify known constructions by providing at the same time a fore frame adapted to form together with the associated body parts a particularly tough structure withstanding any stress which may be imposed upon the vehicle.

According to this invention the fore carriage frame carrying the engine, fore wheels and associated suspension members, comprises two longitudinal members substantially parallel with each other, the said longitudinal members being detachably secured at their rear ends to the bottom of the vehicle body, a fore cross member fast with the said longitudinal members and detachably secured to the ends of two arms extending forwardly and downwardly from the fore body wall, and two lateral standards each fast with its associated longitudinal member at an intermediate point on its length and detachably secured to the said arms, the said standards forming the lateral supporting members for the engine unit which is supported at the back by a cross member carried by the two longitudinal members.

According to a further characteristic feature of this invention, the said frame can advantageously be combined with an independent suspension of the parallelogram type for the fore wheels. In this case the arms of each parallelogram are hinged at the top to the said standard and at their lower end to the longitudinal member, the coiled spring encircling the telescopic shock-absorber being arranged between the pair of lower arms and a seating formed in the top end of the standard.

Further characteristic features and advantages of this invention will be understood from the appended description referring to the accompanying drawing which show by way of example a preferred embodiment of this invention.

Figure 1:
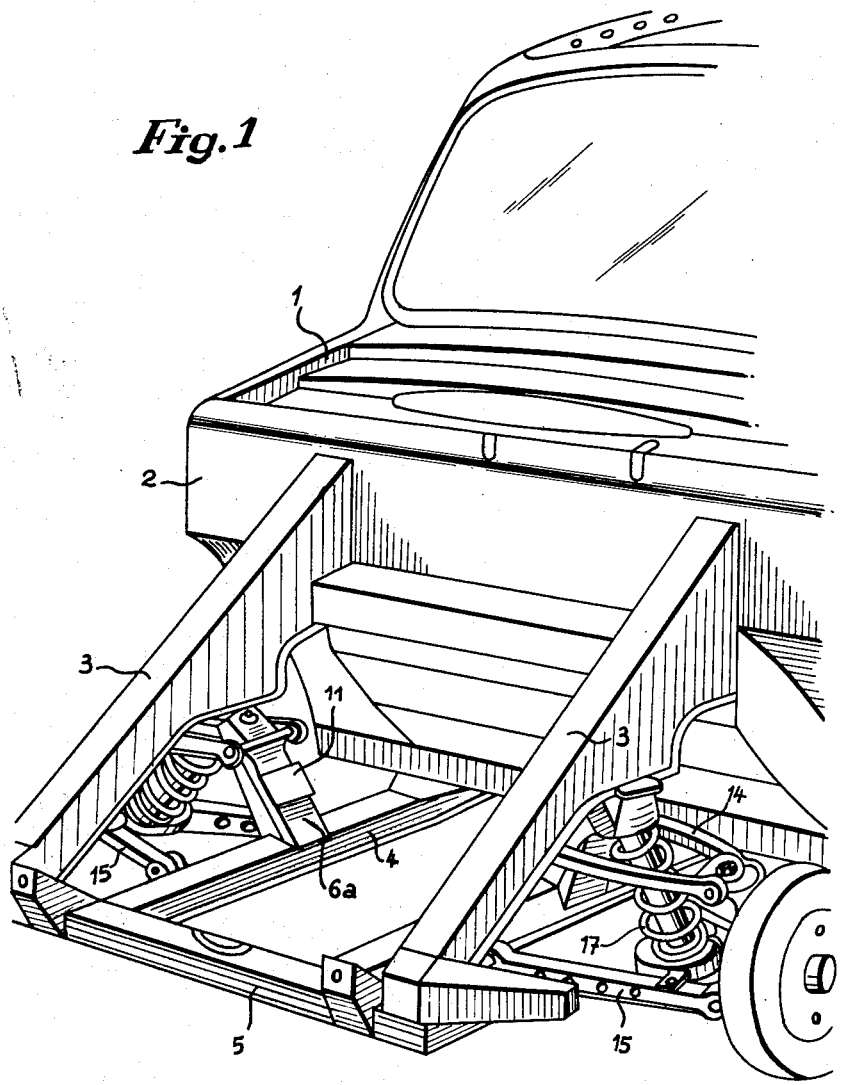
Figure 1 is a perspective view of the front portion of a chassisless coachwork provided with the frame according to this invention.

On the drawing, 1 denotes the chassisless coachwork of a motor vehicle having a fore portion 2 and a bottom 2a. Two arms 3 substantially parallel with each other extend from the wall 2 forwardly and downwardly.

Figure 2:
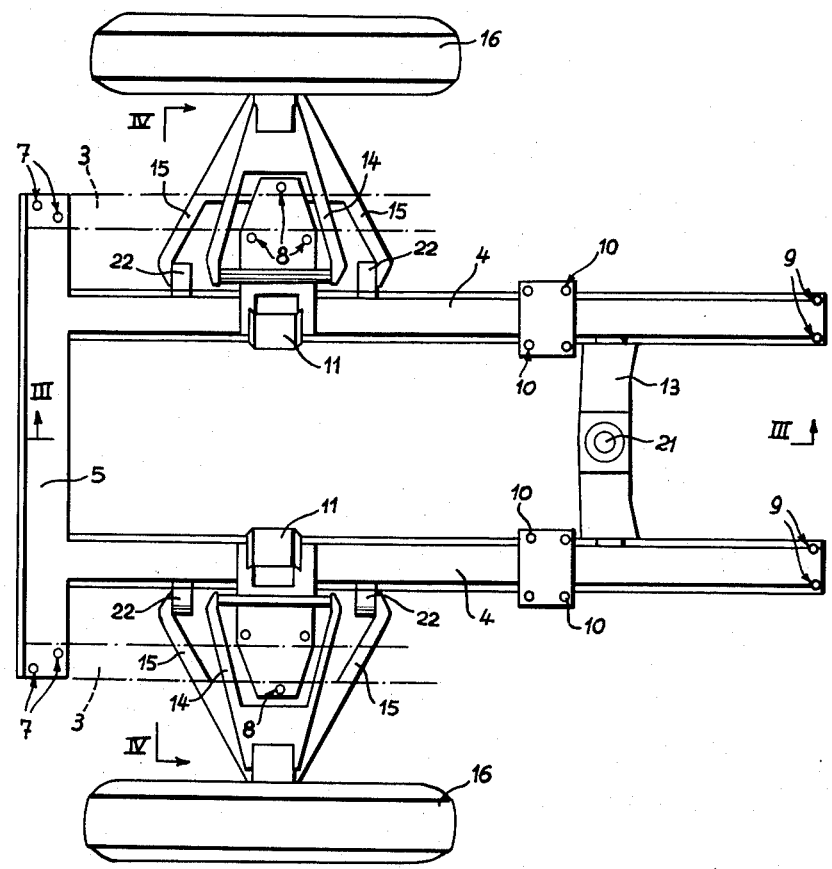
Figure 2 is a diagrammatic plan view of the frame.
Figure 3:
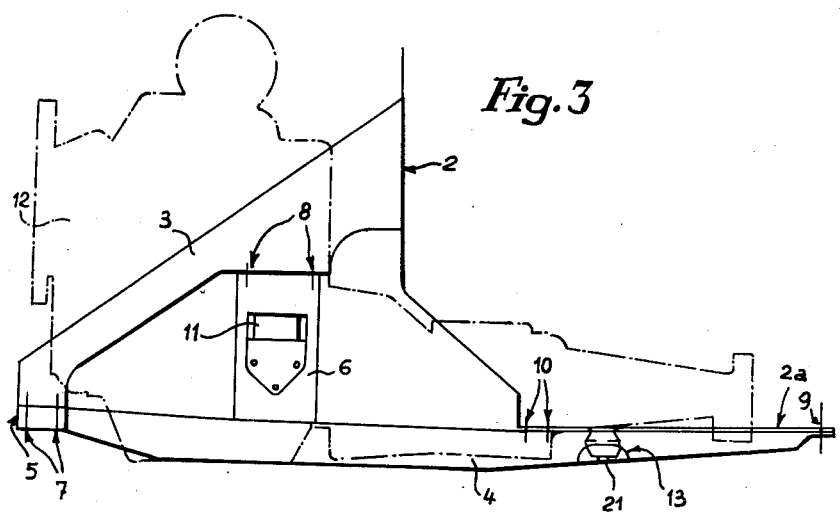
Figures 3 and 4 are two sectional views on lines III—III and IV—IV, respectively, of Figure 2.
Figure 4:
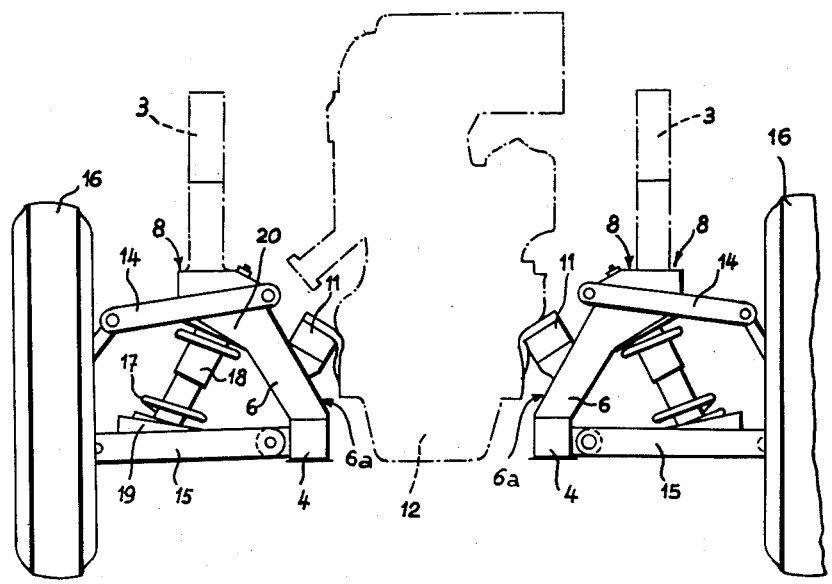

The fore frame according to this invention comprises two longitudinal members 4 substantially parallel with each other, connected together at their front ends by a cross member 5, the ends of which protrude laterally of the longitudinal members. As is visible from Figure 2, the spacing between the two longitudinal members 4 is smaller than the spacing of the arms 3 which are detachably connected to the said protruding ends of the cross member 5. A standard 6 extends upwardly from an intermediate region on each longitudinal member 4 and is fast with its associated longitudinal member and has its top end portion detachably connected to the arm 3 intermediate its length. The said standards 6 diverge upwardly (Figure 4) both for connection purpose and for forming a structure suitable for attachment of the engine and suspension members, as will be described hereafter. The connection points of the arms 3 to the cross member 5 and standards 6 to the arms 3 are indicated in the drawing by 7 and 8, respectively.

The longitudinal members 4 are detachably connected to the body at the points 9 situated at the ends of each longitudinal members and points 10 situated intermediate of each longitudinal member.

The standards 6 are each provided on their inner face 6a at a region intermediate its length with a suitable attachment member 11 which has detachably connected thereto the engine 12 of the motor vehicle The engine unit is carried at its rear end in 21 by a cross member 13 supported by the longitudinal members 4 intermediate between the attachments 9 and 10 of the longitudinal members to the bottom of the coachwork. .

14, 15 denote pairs of hinged arms forming the suspension for the vehicle wheels 16. As is clearly visible in Figure 4, the top arms 14 are hinged to the standards 6 at their inner faces 6a, while the lower arms 15 are hinged to the lugs 22 on the longitudinal members 4. The suspension springs 17 each encircle their associated telescopic shock absorber and are arranged between a seating 19 provided between the lower arms and a seating 20 formed in the top end of each standard 6 at a region thereof which is positioned vertically below the associated arm 3.

It will be understood from the above description that the frame according to this invention fully meets the assembly and strength requirements of the carrying structure of the motor vehicle, though it comprises a very small number of structurally simple component parts, which may be easily manufactured from pressed sheet metal.

It is understood that this invention is not limited to the above described embodiment and various modifications may be made without departing from the scope of the appended claim.

What I claim is:

In a chassisless motor vehicle having two substantially parallel downwardly inclined arms extending towards the front of the vehicle from an upper portion of a wall separating the engine space from the inside of the vehicle body, a detachable fore frame comprising two substantially parallel longitudinal members detachably secured at their rear ends to a bottom structure of the vehicle body, a cross member interconnecting the front ends of said longitudinal members and detachably secured at its end portions to the front ends of the said two arms, two lateral upwardly diverging standards each fast at its lower end with one of the longitudinal members intermediate of its length and detachably secured at its top end to an intermediate portion of an adjacent arm, a support for the engine unit on an inner face of each standard intermediate the ends thereof, the spacing of the two longitudinal members being smaller than the spacing of said arms whereby the ends of the cross member protrude laterally with respect to said longitudinal members, an independent suspension of the parallelogram type including a coil spring encircling a telescopic shock absorber and having its top arms hinged at the top portion of the inner face of the associated standard and the lower arms to the longitudinal member, and a seating formed in the outer face of the standard on the top end portion thereof vertically below the associated downwardly inclined arm, with the said coil spring arranged between the pair of lower arms of the suspension and the said seating.

References Cited in the file of this patent

UNITED STATES PATENTS

| | | |
|---|---|---|
| 2,139,750 | Hicks | Dec. 13, 1938 |
| 2,689,014 | Nallinger | Sept. 14, 1954 |

FOREIGN PATENTS

| | | |
|---|---|---|
| 662,538 | Great Britain | Dec. 5, 1951 |
| 677,861 | Great Britain | Aug. 20, 1952 |